May 20, 1941. J. BLUE, JR 2,242,227
FERTILIZER DISTRIBUTOR
Filed Dec. 29, 1937
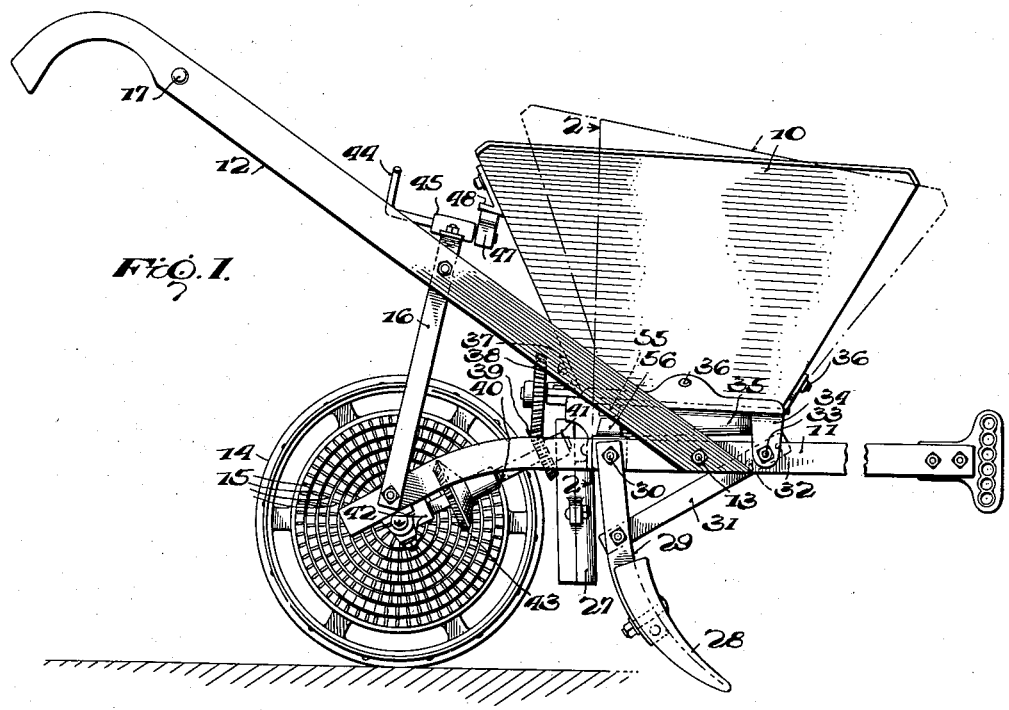
FIG. 1.
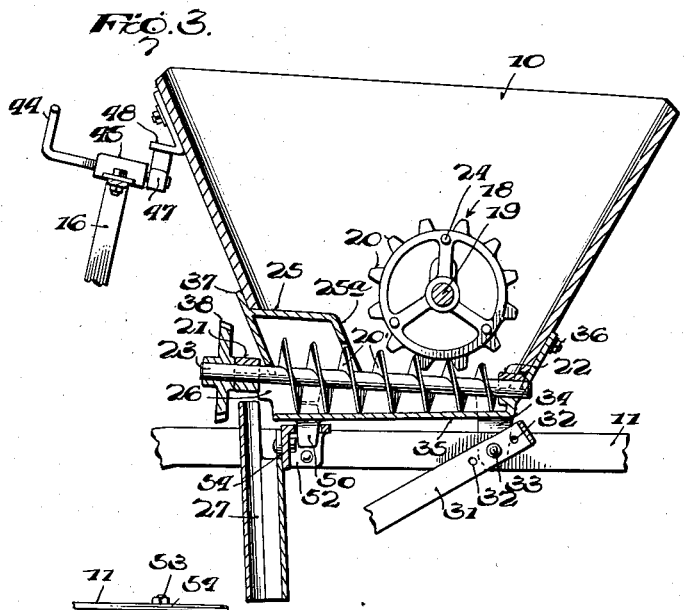
FIG. 3.
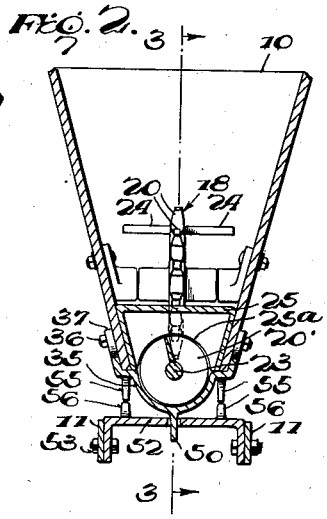
FIG. 2.
FIG. 4.
Inventor
John Blue Jr.
By Philip E. Liggers
Attorney Patented May 20, 1941

2,242,227

UNITED STATES PATENT OFFICE 2,242,227

FERTILIZER DISTRIBUTOR

John Blue, Jr., Laurinburg, N. C.

Application December 29, 1937, Serial No. 182,298

2 Claims. (Cl. 111—71)

This invention relates to fertilizer distributors, and among other objects, aims to provide certain improvements which are described and claimed in the following description of a preferred embodiment of the invention, reference being made to the accompanying drawing forming a part of this specification.

In said drawing—

Fig. 1 is a side elevation of the distributor, showing in dotted lines an alternative position of the hopper;

Fig. 2 is a vertical cross-section on line 2—2 of Fig. 1;

Fig. 3 is a vertical longitudinal section on line 3—3 of Fig. 2; and

Fig. 4 is a detail plan view showing the fertilizer discharge tube and its mounting on the distributor frame.

Referring particularly to the drawing, a fertilizer distributor is shown comprising a hopper 10 for holding the fertilizer, a frame 11 on which the hopper is mounted, and a pair of conventional cultivator handles 12 secured to frame 11 by bolts 13. The rear end of frame 11 carries bearings for a bull wheel 14, one face of which is toothed as indicated at 15, to provide a concentric series of gears for driving at variable speeds the mixer and feeder to be described. Braces 16 support the handles 12 from the rear end of the frame and a cross-bar 17 connects the handles to each other. The parts so far designated by reference numerals are well known in the art.

As fertilizer has a pronounced tendency to pack, especially when placed in a hopper with inwardly sloping sides, as shown, a mixer or agitator as well as a feeder must be employed. The preferred mixer comprises a wheel 18 turning on an axle 19 fixed to the sides of the hopper, said wheel 18 having peripheral teeth 20 which have driving engagement with a tapered worm or screw conveyor 20' which is driven from the bull wheel and has bearings 21, 22 for its shaft 23. The wheel 18 also has arms 24 extending laterally on each side at right angles to the plane of the wheel, there being preferably at least three pairs of said arms, which obviously will rise through the fertilizer to lift the same to break up any lumps or masses which could not be fed by the worm 20'. The taper of the worm will also aid in feeding the fertilizer, as the feed is to the rear, towards which the worm increases in diameter, so that a separation of the fertilizer particles can take place during feeding.

Co-operating with the mixer or agitator and the worm, a baffle 25 extends over the rear end of the worm and has a flange 25ª which extends almost to contact with the edges of the worm, thus preventing any feeding of packed fertilizer and confining the feeding to the areas adjacent the agitator.

Directly beneath the baffle 25 there is a small opening 26 in the wall of the hopper at the discharge end of the worm, and directly beneath opening 26 a fertilizer-discharging tube 27 is placed, so that the fertilizer falls in a stream to the rear of the cultivator blade 28. Said blade 28 is on a beam 29 which is pivotally supported at 30 on the frame 11. A pair of straps 31, each of which has a series of perforations 32 at its forward end, brace the beam 29 and hold it at adjustable angles relative to the ground.

The adjustments of straps 31 are for backward and forward positions so that the same beam 29 may be used to fit any type of plow point or plow sweep, or for use in different types of soil. Thus the user may either side dress the fertilizer or make direct application of the same.

A bolt 33 passed through perforations 32 and through the frame, as shown, may also be passed through ears 34 connecting the worm casing 35 with the frame. The worm casing 35, as shown, closes the bottom of the hopper 10, and preferably is a casting secured by bolts 36. The baffle 25 may be a part of casting, which may have flanges 37 fitting snugly outside the hopper walls, and worm casing to facilitate the rigid connection of the hopper.

The feed worm or conveyor 20' is driven by a bevel gear 38 on the rear end of worm shaft 23, said bevel gear 38 meshing with a bevel gear 39 on the end of shaft 40, said shaft having bearings 41, 42 fast to the frame. Shaft 40 carries a bevel gear 43 which meshes with the teeth 15 on the bull wheel. Obviously as gear 43 is moved toward the periphery of the bull wheel, the speed of rotation of said gear and of the feed worm and agitator will be increased.

It is preferred that the hopper be pivoted to the frame by means of the bolt 33 so that the entire hopper may swing on said bolt as an axis, as indicated in dotted lines in Fig. 1. Such pivotal mounting of the hopper has the advantage of quick disengagement of the gears 38, 39, so that the feeder and agitator may be temporarily disconnected, as when the distributor is being moved from one field to another. Further, pivotal mounting of the hopper facilitates dumping of its contents and thorough cleaning of its walls, etc. To tilt the hopper, a crankshaft 44 is rotatably mounted in a bearing 45 secured to the braces 16 so as to be easily accessible to the operator and a cam 47 on said crankshaft engages under a shoulder or abutment 48 on the side of the hopper which is adjacent the braces 16. Thus the cam has mechanical advantage and the lifting of one end of the hopper is not at all difficult. The ears 34 are so located that the weight of the hopper and contents (if any) aids in the tilting. After initial tilting, the hopper may be further swung until it drops on the frame, as will be understood without illustration.

To insure proper seating of the casting or worm casing 35 and the proper meshing of gears 38 and 39 at all times, guiding means are provided in the form of a tooth 50 integral with casting 35 and projecting downwardly from the bottom thereof, said tooth entering a perforation 51 in the center of a flanged bar 52 secured at its flanged ends by bolts 53 to the frame 11. Preferably bar 52 is L-shaped in cross section and serves also as a support for the upper end of fertilizer-distributing tube 27, bolts 54 providing the connection. Thus disconnecting the angle bar 52 from the frame 11 also removes the tube 27. Lugs 55 projecting below the casting 35 engage the tops of upstanding lugs 56 on the angle bar 52 to center the hopper and prevent side sway.

Obviously the invention may be embodied in several forms neither described nor shown. Moreover it is not indispensable that all the features of the invention be used conjointly.

Having described an embodiment of the invention, what I claim as new and desire to secure by Letters Patent is:

1. A fertilizer distributor comprising, in combination, a traveling frame; a hopper pivoted on the frame so as to be tiltable; means to feed fertilizer from said hopper; a blade secured to a beam which is pivoted at its upper end to the frame; a strap providing a brace for the beam and being connected to the beam and frame at its opposite ends so that its effective length is variable; and a bolt providing a pivot for the hopper and the upper connection for said strap.

2. A fertilizer distributor comprising, in combination, a frame; a hopper; a ground wheel supporting the frame; means driven by said ground wheel to feed fertilizer from said hopper; the hopper being pivotally mounted on the frame; means to tilt the hopper on its pivot; the feeding means being disconnected from the wheel when the hopper is tilted; the hopper having a downwardly directed tooth; the frame having a member perforated to receive said tooth, and the fit of the tooth being close so that the hopper is centered as it is swung back to normal or feeding position; the frame having a pair of upstanding lugs on either side of the central vertical longitudinal plane of the hopper; and the hopper having a pair of downwardly extending lugs on the underside adapted to engage the tops of the lugs on the frame when the hopper is in said normal position, thereby to prevent sidesway of the hopper on its pivot.

JOHN BLUE, JR.